United States Patent Office 2,723,300
Patented Nov. 8, 1955

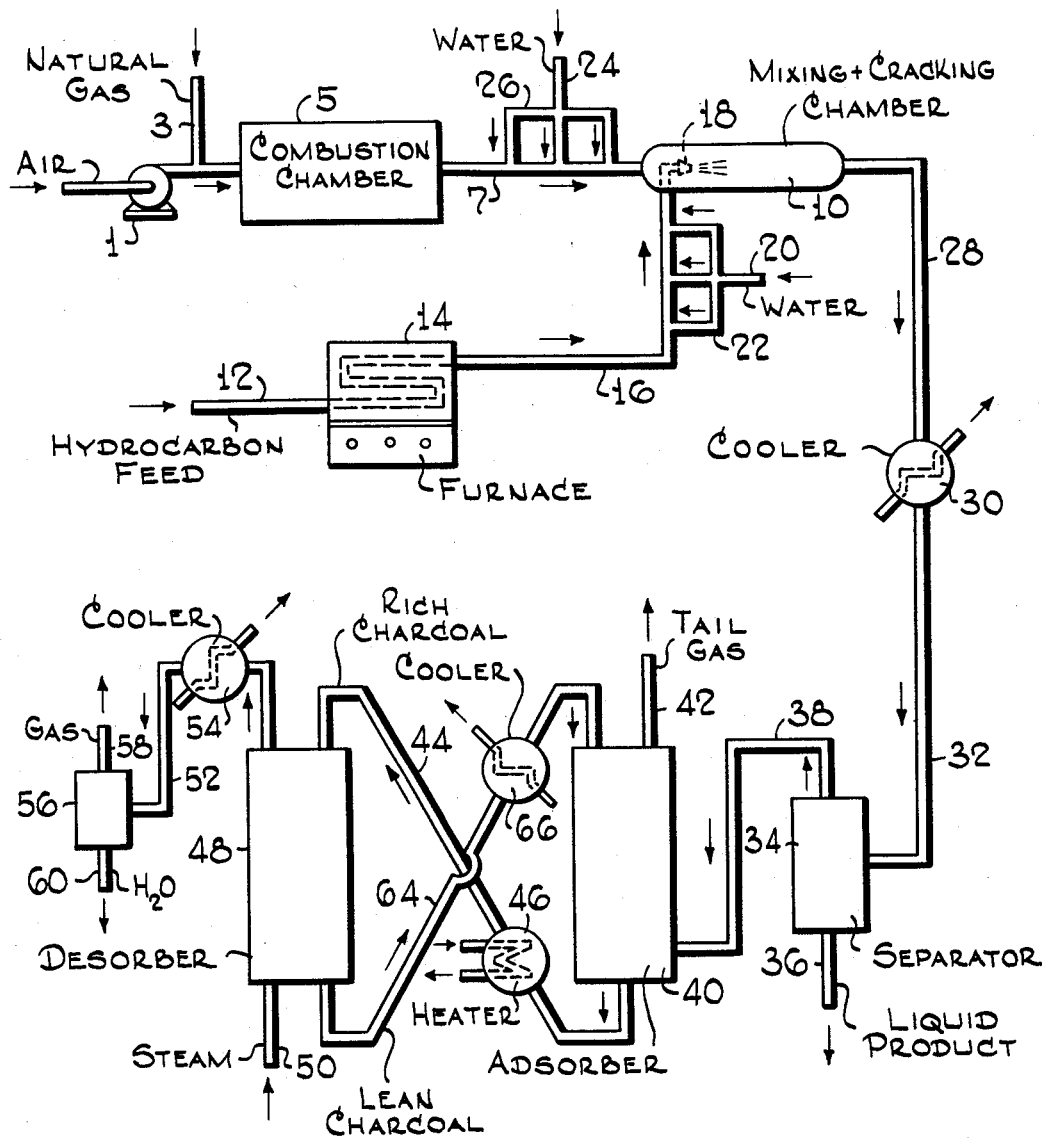

2,723,300

QUENCHING METHOD FOR SHORT-TIME, HIGH-TEMPERATURE GAS-PHASE REACTIONS

Warren K. Lewis, Jr., Elizabeth, N. J., assignor to Esso Research and Engineering Company, a corporation of Delaware Application October 1, 1951, Serial No. 249,070

15 Claims. (Cl. 260—679)

The present invention relates to improvements in carrying out short-time, high-temperature gas-phase reactions. The invention has particular utility in the thermal cracking of hydrocarbons.

In brief compass, the invention involves mixing the reactant gases or vapors, such as hydrocarbon vapors to be cracked, under conditions of extreme turbulence with a high velocity stream of hot gases having a temperature substantially above the desired reaction temperature and vaporizing within the mixture a finely divided liquid boiling substantially below reaction temperature.

Many chemical reactions which are carried out at high temperatures require short reaction times to avoid side reactions and/or overtreating. For example, it has long been known that thermal cracking of certain, particularly relatively low boiling, hydrocarbons affords unusually good results when carried out at very high temperatures for very short reaction times. Such a process calls for both rapid heating to the desired cracking temperature and rapid cooling after the required reaction time has elapsed.

Prior to the present invention, the reaction time of reactions of this type has been cut short by quenching the reaction mixture immediately upon leaving the reaction zone proper with a cool quench liquid. For example, it has been proposed, to mix hydrocarbon vapors to be cracked with a high velocity stream of hot flue gases, passing the mixture in the presence of finely divided catalyst through a reaction zone and quenching the reaction mixture after a short time of reaction by introducing a cool quenching liquid, such as oil or water, into the discharge end of the reaction zone.

Procedures of this and similar types which rely on contact of the reaction mixture with the quench liquid after the reaction is substantially complete, are rather inefficient. The quench liquid requires a considerable length of time to become heated by the reaction mixture. During a substantial portion of this time the reaction continues, so that no immediate quench effect is accomplished and overtreating may take place. In addition, turbulence is substantially reduced at the discharge end of the reaction zone or at any point substantially removed from the point at which heating gases and feed are mixed, so that the distribution and quenching effect of the quench liquid become less uniform. The present invention overcomes these difficulties and affords various additional advantages as will appear hereinafter.

It is, therefore, the principal object of the present invention to provide improved means for controlling the reaction time of high-temperature, short-time gas-phase reactions. Other and more specific objects will appear from the following description of the invention wherein reference will be made to the accompanying drawing, the single figure of which is a semi-diagrammatical illustration of a system adapted to carry out an embodiment of the invention.

In accordance with the present invention the reactant gases or vapors are injected into a high velocity gas stream having a temperature sufficiently high to establish the desired reaction temperature in the gasiform mixture obtained. The feed stream is injected into the heating gas stream in such a manner that a jet effect associated with extreme turbulence is accomplished. A quenching liquid boiling substantially below the desired reaction temperature level is introduced in a finely divided state, such as a spray or mist, into the mixture at the point of its formation. Depending on the speed of quenching desired, the atomized quenching liquid may be originally supplied to the heating gas stream or the reactant feed stream, or at the point of mixing of the two, or at any combination of these places. The amount of quenching liquid so introduced should be at least that required to lower, by its complete vaporization, the temperature of the reaction mixture from a reactive level to a level at which reaction is essentially arrested, so that no further quenching is required to prevent overtreating.

In accordance with the preferred embodiment of the invention, the amount of quenching liquid so introduced does not substantially exceed this required amount so that the rate of quenching is essentially controlled by the speed of evaporation of the quenching liquid. When so operating, evaporation ends when the reaction is arrested, without undesirable excessive heat removal beyond this point, so that the reaction effluent retains a maximum amount of heat for profitable recovery.

The injection of the quenching liquid should be so controlled that most of the vaporization takes place after the point where the streams of heating gas and reactant feed meet and the reaction sets in. Once the feed has entered the reaction zone it will be subjected to two opposite influences, viz., (a) admixture of heating gas, which tends to increase the temperature of the feed and (b) evaporation of the quenching liquid, which tends to decrease the temperature of the feed. In the zone adjacent to the mixing zone, effect (a) will predominate so that the temperature of the feed will rise rapidly up to the desired reaction temperature. As the feed leaves the zone of most rapid mixing, effect (a) will diminish until it is counterbalanced by effect (b), i. e., the temperature of the feed will remain more or less constant for a short period of time at the desired reaction temperature. Finally, the feed passes to a zone where essentially no further mixing takes place and, here, effect (b) predominates so that the temperature rapidly drops until the reaction rate has dropped to essentially zero.

It is apparent that the feed can be subjected to a wide variety of time vs. temperature relationships by proper control of the feed rates and temperatures of the heating gas and feed, the rate of mixing, the amount and degree of dispersion of the quenching liquid, and the point of quenching liquid injection, i. e., whether the quenching liquid is originally supplied to the feed stream or to the heating gas. This type of reaction control is facilitated by the fact that the evaporation of liquid droplets even at large temperature differentials, say, of 1000° F. or more is not instantaneous but spreads over an appreciable length of time even at temperatures far above the boiling point of the liquid which is best illustrated by the common occurrence of water droplets dancing on red hot surfaces.

As indicated above, the speed of quenching depends to a certain extent on the point at which the quenching liquid is originally supplied. The quenching liquid may be injected into the heating gas stream at a point prior to the addition of the reactant. In this case the quenching liquid will reach a relatively high temperature by the time it reaches the point of reactant addition without affecting, prior to this point, the temperature of the feed. Evaporation of the quenching liquid will have a cooling effect on the feed from there on and this effect will increase as mixing of the heating gas with the feed proceeds.

The quenching liquid may also be injected into the gaseous reactant feed stream. In this case, the cooling effect begins even before mixing between the feed and the heating gas takes place. The time required for attaining reaction temperature in the mixing zone is thus extended as compared to injection of the quenching liquid into the heating gas stream.

Increased flexibility of temperature control may be provided by proper distribution of the total amount of quenching liquid between the two gas streams. Supply of the quenching liquid to either or both gas streams ahead of the mixing zone is superior to its direct injection into the mixing or reaction zone, which affords a much lesser degree of flexibility of control of reaction time and temperature. However, in suitable cases a portion or all of the quenching liquid may be originally injected directly into the mixing or reaction zone at the point of confluence of the two gaseous streams.

In addition to variations of the point of quenching liquid injection, variations in the droplet size of the injected liquid may be used to control evaporation speed and with it reaction time. At a constant rate of liquid injection and under otherwise equal conditions, the speed of evaporation will be the greater and the time of reaction the shorter the smaller the droplet size.

These methods of reaction control are characteristic for the present invention. They permit the maintenance of much shorter reaction times than is possible when using merely such conventional methods as variations in heating gas rate, heating temperature, reactant preheat, reactant feed rate, gas velocities in the reaction zone, mixing intensity, etc.

Specific conditions, of course, depend on the type of reaction involved, the reaction time and temperature desired and the type of quenching liquid used. Quite generally, it may be stated that the present invention is of greatest utility for reactions carried out at temperatures above 1000° F. for times of not more and preferably less than one second. In most cases, water is the most desirable quenching liquid because of its low boiling point, high heat of vaporization and low cost. However, other liquids, such as normally liquid hydrocarbons, may be used, particularly when water would interfere with the reaction.

When using water as the quenching liquid for reactions carried out at temperatures of about 1000°–1600° F., water droplet sizes of about $\frac{1}{25}$–$\frac{1}{3}$ millimeters in diameter may be used for evaporation times of less than one second. The amount, in pounds per hour, of quenching liquid required when complete vaporization within the desired reaction time is contemplated in accordance with the invention is about equal to the desired rate of heat removal in B. t. u. per hour divided by the latent heat of vaporization of the quenching liquid, which, in the case of water, is about 1000 B. t. u. per pound. As a general rule, for small droplets the time required for complete vaporization, which controls the reaction time, is approximately proportional to the square of the initial diameter. In the case of water this applies to droplet sizes not substantially exceeding 0.3 millimeter.

The invention affords greatest advantages when applied to the cracking of hydrocarbons, particularly of light paraffins, such as methane, ethane, and propane, to produce unsaturated light hydrocarbons, such as ethylene, acetylene, etc., which are highly reactive at cracking temperatures and, therefore, subject to undesired side reactions, such as coke formation in conventional operation. However, the invention is also applicable to the cracking of higher boiling hydrocarbons, such as naphthas or gas oils, to produce high quality motor fuels. Thermal cracking of light hydrocarbons may be carried out at about 1300°–1600° F. for about 0.01–1 second using hot flue gas of about 2000°–2500° F. as heating gas and water of 0.04–0.4 millimeter droplet size as the quenching liquid, at a rate of about 0.1–0.6 pound per pound of hydrocarbon feed. Coke formation is substantially reduced as the result of the efficient quenching of the invention.

Having set forth its objects and general nature, the invention will be best understood from the following more detailed description wherein reference will be made to the drawing.

Referring now to the drawing, the system illustrated therein essentially comprises a combustion chamber 5, a mixing and cracking chamber 10 and product recovery equipment 34, 40, 48 and 56. The function and coaction of these elements will be described using the thermal cracking of light hydrocarbons as an example. However, the system may be used in a generally analogous manner for carrying out other high-temperature, short-time reactions.

In operation, combustion chamber 5 is supplied with air by blower 1 and with a suitable fuel, such as natural gas or any other fuel gas or vapor, from line 3. Combustion takes place in chamber 5. Hot flue gas is withdrawn from chamber 5 at a temperature of about 2000°–2500° F., and passed via line 7 to mixing and cracking chamber 10.

A light hydrocarbon feed stock, say, ethane, propane, or a mixture of the two, is supplied via line 12 to a coil furnace 14 where it is preheated to a temperature of about 900°–1100° F. The preheated feed is passed via line 16 to a jet nozzle 18 located in cracking chamber 10. Nozzle 18 may have the form of a steam injector or similar device adapted to provide highest gas turbulence at the point of entry of the hydrocarbons into cracking chamber 10. The feed rates of flue gas and hydrocarbons are so chosen that the temperature of the gas-vapor mixture adjacent to nozzle 18 is about 1300°–1600° F. suitable for thermal cracking.

In order to limit the time and extent of cracking taking place at a temperature above about 1300° F., finely divided liquid water is introduced into chamber 10 in accordance with the invention. Two points for introducing water into the system are shown in the drawing. The water may be supplied either via line 20 and manifold 22 into feed line 16 or via line 24 and manifold 26 into the path of the flue gas. The discharge ends of manifolds 22 and 26 are preferably provided with suitable spray nozzles designed to produce water droplets of any desirable size below, say, about 0.4 millimeter diameter. Water droplets of the size indicated remain liquid at temperatures of about 1400° F. for a maximum of about one second. The discharge points of manifolds 22 and 26 should, therefore, be so arranged as to exclude maximum water residence times exceeding this time within system parts upstream of nozzle 18.

The entire amount of water required to reduce by its evaporation the temperature of the gas-vapor mixture from a reactive level of about 1300°–1600° F. to an essentially non-reactive level of about 900°–1100° F. is introduced through lines 20 and/or 24. About 0.1–0.6 pound of water per pound of hydrocarbon feed is normally adequate for this purpose at the conditions here specified. The speed of quenching is controlled by properly proportioning the water supply between lines 20 and 24 and the branches of manifolds 22 and/or 26, and/or by properly adjusting the droplet size of the water entering the system in this manner.

These process variables may be changed by hand or automatically as a function of continuous product analysis and/or temperature readings at different points along the path of the reaction mixture in a manner well understood by those skilled in the art. For example, if the temperature remains too high over too long a distance in chamber 10, the relative feed rate of water through line 20 or 24 may be increased and/or the point of water injection shifted toward nozzle 18 by properly manipulating manifolds 22 and/or 26, and/or the droplet size of the injected water may be reduced. For the purposes of the present example, the reaction mixture should be maintained between about 1300° and 1600° F. for about 0.01–1 second in this manner to accomplish best results.

The reaction mixture, now at an essentially non-reactive temperature level of, say, about 900°–1100° F. is withdrawn from chamber 10 via line 28 and passed to a cooler or heat exchanger 30. Steam may be produced or superheated in cooler 30 or other use may be made therein of the reaction mixture. For example, the hydrocarbon feed stock may be preheated in cooler 30.

The cooled reaction mixture may be passed substantially at atmospheric temperature via line 32 to a vapor-liquid separating drum 34. Water and any liquid material which may have been formed by polymerization may be recovered via line 36. A mixture of product gases and used heating gases is withdrawn from separator 34 via line 38 and passed to a suitable adsorption tower or similar adsorption plant 40 wherein desired hydrocarbon gases, such as ethylene, acetylene, propylene, etc., are adsorbed on activated carbon, silica gel, or a similar adsorbent, while flue gas constituents and undesired hydrocarbon gases, such as methane, remain unadsorbed.

Tail gas consisting chiefly of inert flue gas components and a minor proportion of methane may be vented through line 42 or recovered to serve as a low B. t. u. fuel gas. Rich adsorbent is withdrawn via line 44, passed through heater 46 and supplied to desorber tower 48 at a temperature of about 400°–600° F. Steam is admitted to tower 48 through line 50 at conditions adapted to strip adsorbed hydrocarbons from the adsorbent.

The strippings from tower 48 are passed via line 52 and cooler 54 to a gas-liquid separator 56. Product hydrocarbon gases are recovered from the top of separator 56 via line 58. Water may be removed from the bottom of separator 56 via line 60.

Lean adsorbent is withdrawn from desorption tower 48 via line 64. The adsorbent is cooled in cooler 66 to atmospheric temperature or thereabouts and then returned to adsorption tower 40 for reuse.

The above description and exemplary operations have served to illustrate specific embodiments of the invention. It will be understood that the invention embraces such other variations and modifications as come within the spirit and scope thereof.

What is claimed is:

1. In an endothermic gas phase reaction process wherein the heat of reaction is supplied by an inactive heat-carrying gas by turbulently admixing said heat carrying gas with a reactant gas in a reaction zone so that the resultant mixture temperature is the reaction temperature, the improved method for controlling the reaction time of said process which comprises introducing a finely divided non-reactive liquid having a boiling point substantially below the temperature of reaction into said reaction zone at the point of said admixing, the amount of said liquid being sufficient to decrease by means of vaporization the reaction temperature to a level at which said reaction is substantially arrested, and the particle size of said finely divided liquid is so adjusted that the rate of vaporization of said finely divided liquid will cause said decrease in reaction temperature only after a predetermined reaction time has elapsed.

2. The process of claim 1 in which at least a portion of said liquid is originally introduced into a component of said mixture prior to the formation of said mixture and carried by said component to said feed point.

3. The process of claim 1 in which at least a portion of said finely divided liquid is originally introduced into said heat-carrying gases.

4. The process of claim 1 in which at least a portion of said finely divided liquid is originally introduced into said gasiform reactant.

5. A process of carrying out a high-temperature, short-time gas phase reaction which comprises intimately mixing in a reaction zone under conditions of high turbulence a stream of gasiform reactant undergoing said reaction at said high temperature within said short time and having a temperature substantially below said high temperature with a stream of heat-carrying gases heated substantially above said high temperature to form a turbulent mixture having said high temperature, passing said mixture through said reaction zone, the turbulence of said mixture decreasing on its path through said zone, introducing a finely divided liquid not interfering with said reaction and having a boiling point substantially below said high temperature into said reaction zone at the point of confluence of said streams, substantially completely vaporizing said liquid in said mixture on said path, regulating the amount of said liquid to absorb as heat of vaporization the heat required to reduce said high temperature to a level at which said reaction is essentially arrested and regulating the droplet size of said liquid such that the rate of said vaporization will not cause said reduction of temperature until the desired reaction time has elapsed the vaporization time being approximately proportional to the square of the initial diameter of said droplets.

6. The process of claim 5 in which said high temperature is substantially in excess of 1000° F. and said reaction time is less than one second.

7. The process of claim 6 in which said liquid is water and said diameter does not substantially exceed 0.3 millimeter.

8. In the thermal cracking of hydrocarbons by a high-temperature, short-time gas phase reaction, by intimately mixing under conditions of high turbulence in a cracking zone a stream of gasiform hydrocarbons having a temperature substantially below said high temperature with a stream of heat-carrying gases heated substantially above said high temperature to form a turbulent mixture having said high temperature, and passing said mixture through said cracking zone, an improved method for controlling the time of said reaction which comprises introducing a finely divided liquid not interfering with said reaction and having a boiling point substantially below said high temperature into said cracking zone at the point of confluence of said streams, substantially completely vaporizing said liquid in said mixture on its path through said reaction zone; regulating the amount of said liquid to absorb as heat of vaporization the heat required to reduce said high temperature to a level at which said cracking is essentially arrested and regulating the droplet size of said liquid such that the rate of vaporization of said liquid will not cause said reduction in temperature until the desired reaction time has elapsed.

9. The process of claim 8 in which said hydrocarbons are normally gaseous paraffins and said high temperature is about 1300°–1600° F., said short time being less than one second.

10. The process of claim 9 in which said liquid is water and said droplets have a diameter of about $\frac{1}{25}$–$\frac{1}{3}$ millimeter.

11. The process of claim 8 in which at least a portion of said finely divided liquid is added to said hydrocarbon stream prior to said point of confluence.

12. The process of claim 8 in which at least a portion of said finely divided liquid is added to said stream of heat-carrying gases prior to said point of confluence.

13. The process of claim 8 in which at least a portion of said finely divided liquid is added to a component of said mixture at a distance upstream of said point of confluence, said distance being variable.

14. In the thermal cracking of normally gaseous paraffinic hydrocarbons by a high-temperature, short-time gas phase reaction, the improvement which comprises intimately mixing in a cracking zone under conditions of high turbulence a stream of said hydrocarbons preheated to about 900°–1100° F. with a stream of flue gases having a temperature of about 2000°–2500° F. in amounts adequate to form a mixture having a temperature of about 1300°–1600° F., passing said mixture through said cracking zone, the turbulence of said mixture decreasing on its path through said cracking zone, introducing finely divided water having a droplet size of about 0.04–0.4 millimeter diameter into said cracking zone at the point of confluence of said streams, and substantially completely vaporizing said water in said mixture on its path through said cracking zone, the amount of said water being just about adequate to absorb as heat of vaporization the heat required to reduce said mixture temperature to about 900°–1100° F., and the time for which said mixture is maintained at about 1300°–1600° F. being about 0.01–1 second.

15. The process of claim 14 in which at least a portion of said water is introduced in a finely divided state into one of said streams at a variable distance upstream of said point.

References Cited in the file of this patent

UNITED STATES PATENTS

| | | |
|---|---|---|
| 2,127,009 | Pyzel | Aug. 16, 1938 |
| 2,158,582 | Isham et al. | May 16, 1939 |
| 2,331,343 | Phillips | Oct. 12, 1943 |
| 2,377,847 | Allen et al. | June 12, 1945 |
| 2,427,112 | Tyson | Sept. 9, 1947 |
| 2,475,214 | Barr | July 5, 1949 |